United States Patent Office 3,482,349
Patented Dec. 9, 1969

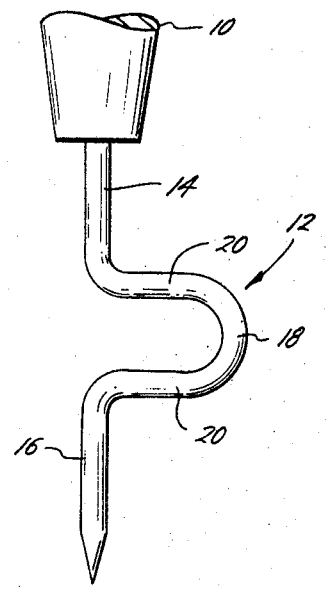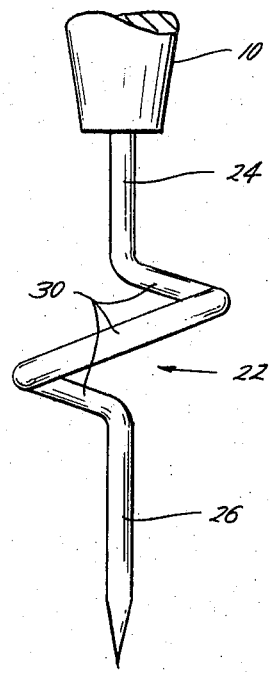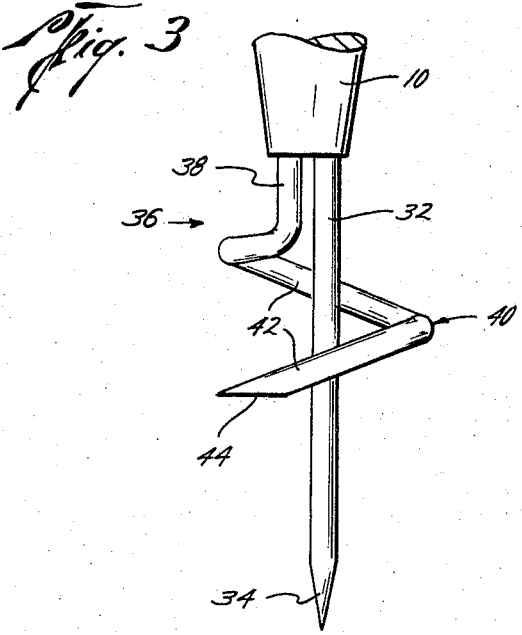

3,482,349
BARBLESS FISHING SPEAR
Bob J. Spann, Suite 900, Wilson Bldg.,
Corpus Christi, Tex. 78401
Continuation of application Ser. No. 620,817, Mar. 6, 1967, which is a continuation-in-part of application Ser. No. 421,734 Dec. 28, 1964. This application Apr. 4, 1969, Ser. No. 814,234
Int. Cl. A01k 81/04
U.S. Cl. 43—6            3 Claims

ABSTRACT OF THE DISCLOSURE

A fishing spear has a barbless impaling tine joined to one of an elongated handle. In one form in the tine has an intermediate helical portion, in another form the tine has an intermediate C-shaped offset, and in still another form the tine includes a straight shank portion encircled by a helical portion.

Cross-references to related applications

This application is a continuation of my now abandoned co-pending application, Serial No. 620,817, filed March 6, 1967, entitled "Barbless Fishing Spear" which in turn was a continuation-in-part of my now abandoned co-pending application, Serial No. 421,734, filed December 28, 1964, entitled "Barbless Fishing Spear."

Background of the invention

A sport having a relatively wide appeal is that of hunting fish, frogs, and other similar game (all of which will hereinafter be referred to as fish for purposes of simplicity) with spears or gigs. Quite often it is necessary for a spear fisherman to have a number of gigs or spears for the various types of sport fish. Some require a plurality of tines with barbs of varying sizes. For other fish, a single tine is sufficient due to the fact the fish are small enough to be retained by one tine. The necessity of having more than one spear is, of course, undesirable. Some states prohibit the use of barbed spears and gigs in the taking of certain fish. There is, therefore, a necessity for a spear or gig that has no barb but that is capable of holding or releasing a fish.

Another problem that has persisted in this field is that of making a spear that would retain the fish, preventing it from slipping off of the spear, yet would not result in extensive damage to the fish. Such damage would result, for example, where barbs are used on the tines of the spears and would occur when spearing the fish or when attempting to later remove the fish from the spear.

An additional problem that also persists is that of releasing dangerous fish that have been speared by accident or mistake. An example of this is found in the sport of "floundering" which consists of spearing flounders that have burrowed into the said and mud in shallow water. Sting rays also burrow into the sand in a similar manner and may quite easily be mistaken for flounder. One experienced in this sport will realize that spearing a fish does not usually kill it. As is readily apparent, therefore, releasing such as a sting ray from the spear could be quite dangerous to the person if it is necessary to get close to or touch the sting ray.

Summary of the present invention

The present invention utilizes means on a spear or gig which will allow one to spear and retain any fish normally hunted in this manner. This is accomplished in the present invention by use of a lateral offset portion in the tine or tines. Thus, when a fish is speared, by manipulating the spear, the body of the fish will slide onto this offset portion. This will prevent the fish from falling off of the tine. These offsets may be looped-shaped, C-shaped, helically or spirally-shaped, or merely a straight lateral bend in the tine. Other configurations will come readily to mind. To remove undesired or dangerous fish, all one need do is twist and shake the spear and the fish will fall off.

As will be seen, no barbs are used on the present invention, and the tine presents an essentially straight, smooth surface. Relatively little damage is done to the fish with the present invention in comparison to the damage that would be done when using barbs, both in spearing the fish and in removing the spear from the fish.

It is, therefore, an object of the present invention to provide a barbless hunting spear having means to retain speared fish on the spear, but without causing undue damage to the fish.

Another object of the present invention is to provide a barbless hunting spear having retention means for the speared fish from which the fish may be easily and quickly released by mere manipulation of the spear itself without the necessity of touching the fish.

Another object is to provide such a spear having laterally extending portions in the tine as the retention means, whereby the tine presents a smooth unbroken surface.

Other and further objects, features and advantages will be apparent from the following description of a presently preferred embodiment of the invention, given for the purpose of disclosure, taken in conjunction with the accompanying drawing.

Brief description of the drawing

In the attached drawing, like character references designate like parts throughout the several views, which views are as follows:

FIGURE 1 is a side view of a first embodiment of the present invention, the spear handle being only partially shown for simplicity, FIGURE 2 is a side view of the second embodiment of the present invention, the spear handle, once again, being only partially shown for simplicity, and FIGURE 3 is a side view of a third embodiment of the present invention, again the spear handle being only partially shown.

Description of the preferred embodiments

Turning now to FIGURE 1 of the attached drawing, one of the preferred embodiments is shown in which the laterally offset portion is generally C or looped-shaped. This embodiment consists essentially of a handle portion 10, which is only partially shown, and a tine generally indicated by the numeral 12.

The tine 12 is made up of three portions. The first portion is the shank 14, which connects the tine 12 with the handle 10. The sharpened tip 16 is, of course, located on the free end of the tine. The shank and tip are generally parallel to the longitudinal axis of the handle. Connecting the tip 16 to the shank portion 14 is the connecting portion 18 which contains the lateral offsets 20. As can be seen in FIGURE 1, the tine presents a smooth, unbroken surface, although it is curved as is shown.

In the use of this embodiment, the fish is speared in a normal manner. By proper manipulation of the spear, working the fish against the bottom of the body of water, the body of the fish may be worked into the laterally offset portions 20. The lowermost lateral offset 20 will prevent the fish from wiggling or falling off the tine. If desired, the fish may be worked on past the loop to the uppermost lateral offset 20 or onto the shank 14.

In this manner, the fish will be securely fastened on the spear before the spear is withdrawn from the bottom of the body of water. In addition, the action of manipulating the spear to work the body of the fish onto the upper or offset portions of the spear, will not cause undue damage to the fish due to the continuously smooth surface of the tine.

To remove undesired or dangerous fish, it is only necessary, once again, to manipulate or twist the spear to release it from the tine. It is, accordingly, not necessary to get dangerously close to or touch the fish to remove it from the spear.

Turning now to FIGURE 2, the second embodiment will be discussed. Once again, this embodiment consists of a handle portion 10 which is only partially shown. The tine generally indicated by the numeral 22 is also composed of three sections, the shank portion 24, the tip 26 and the connecting portion 30. In this embodiment, the connecting portion 30 is helically or spirally-shaped. This connecting portion has, of course, a plurality of laterally extending portions due to its helical or spiral configuration. In fact, essentially the entire length of the helical portion 30 may be considered as being lateral to the longitudinal axis of the tip 26. As will be understood, the connecting portion 30 may be composed of one loop as shown in FIGURE 2, or a number of loops, as may be desired.

The operation of this embodiment is essentially the same as with the embodiment shown in FIGURE 1. It may be readily seen that, to move the body of a fish onto a laterally offset portion 30, it is only necessary to rotate the spear handle 10 as one presses the speared fish against the bottom of the body of water. In this manner, the tine 22 will, in effect, screw itself to the body of the fish. Once again, due to the smooth and unbroken surface of tine 22, a minimum amount of damage will be done to the fish as it is moved into the helically or spirally-shaped portion 30. In like manner, the fish may be removed by merely rotating the handle in the opposite direction.

Turning now to FIGURE 3, the third embodiment disclosed herein will be discussed. This embodiment consists of a handle portion 10 which is, once again, only partially shown. A first tine 32 extends from a tip of the handle and is an essentially straight tine having a sharpened tip 34. A second tine, generally indicated at 36, also extends from the tip of the handle 10. This second tine is formed of a shank portion 38 and a helically or spirally shaped portion 40. As with the embodiment shown in FIGURE 2, the number of loops in portion 40 may be varied as desired. It should once again be understood that the lateral offsets used in this embodiment may be "C" shaped, looped shaped, or merely a straight lateral bend in the tine. The portion 40 terminates in a sharpened point 44, and has lateral portions 42 similar to portions 30 in the last embodiment. As can be seen from the drawing, the first or straight tine 32 extends through the coils of the helical portion 40 of the second tine 36.

In using this embodiment, the fish is speared in the normal manner. To get the body of the fish on to the lateral offsets 42, the spear is rotated as was discussed in the embodiment shown in FIGURE 2. The body of the fish will become impaled by the sharpened point 44 of the second tine 36. Further rotation will cause the coils of the helical portion 40 to pass through the body of the fish, thereby providing means to prevent the fish from falling from the spear. The fish is removed in the same manner as was discussed in removing fish from the embodiment shown in FIGURE 2. The embodiment of FIGURE 3 does have the disadvantage of causing some additional damage to the fish in comparison with the first two embodiments, due to the fact that in this last embodiment, two tines will enter the fish. Nevertheless, because these tines are, once again, smooth surfaced and have no barbs, this damage to the fish is maintained at a minimum.

A fourth embodiment, as previously mentioned is comprised of a shank, a tip and a laterally offset portion. The offset portion in this embodiment is merely a lateral bend in the tine with no curvature, excepting, of course, at the bends connecting the shank, tip and offset portions. It is, in effect, simply the top half of the offset portion of the FIGURE 1 embodiment. The operation of this embodiment is, once again, the same as with the first discussed embodiment. As previously pointed out, this type of offset may be used with the double tine embodiments, one of which is shown in FIGURE 3.

As is seen, therefore, the present invention, as exemplified by the embodiments disclosed herein, achieves the objectives set forth at the outset. A spear has been devised which has no barbs but which has means in the form of lateral offsets to secure and retain the speared fish and game. Accordingly, no unnecessary damage is done to the game as it is speared or as it is removed from the spear. In addition, with the present invention, the game may be removed from the spear by merely manipulating the spear handle and without the necessity of touching the speared game.

The present invention, therefore, is well adapted to carry out the objects and attain the ends and advantages mentioned as well as others inherent therein.

I claim:
1. A barbless spear for use in spearing a fish and the like comprising,
an elongated handle whereby the user can hold the spear and spear fish at a safe distance therefrom, said handle having a longitudinal axis,
at least one tine extending outwardly from one end of said handle,
a first portion of said tine extending generally parallel to said axis, said first portion being further defined as,
a tip of sufficient length to penetrate through said fish, and
a second portion of said tine being laterally offset from said axis, said second portion being further defined as,
a helical portion located adjacent the tip and positioned between the tip and said handle.
2. The invention of claim 1 and including,
a shank connected to the helical portion and extending between the helical portion and said one end of the handle.
3. The invention of claim 1 wherein,
the length of the tip is greater than the length of the helical portion measured along the handle axis extended to said helical portion.

UNITED STATES PATENTS

References Cited

| | | | |
|---|---|---|---|
| 179,090 | 6/1876 | Barnes | 81—3.45 |
| 350,702 | 10/1886 | Schollhorn | 81—3.45 X |
| 796,413 | 8/1905 | Butler | 43—6 |
| 880,807 | 3/1908 | Menkin | 294—61 X |
| 1,446,277 | 2/1923 | Stafford | 81—3.49 |
| 1,657,728 | 1/1928 | Untiedt | 81—3.45 X |
| 2,619,371 | 11/1952 | Kroenlein | 294—61 |
| 3,162,475 | 12/1964 | Van Allen | 294—61 X |
| 3,216,141 | 11/1965 | Walger | 43—6 |

FOREIGN PATENTS 22,472    1906    Great Britain.

WARNER H. CAMP, Primary Examiner